United States Patent
Munshi et al.

(10) Patent No.: US 11,267,915 B2
(45) Date of Patent: Mar. 8, 2022

(54) PROCESS FOR THE PREPARATION OF DRY CHLORINATED POLYVINYL CHLORIDE

(71) Applicant: RELIANCE INDUSTRIES LIMITED, Maharashtra (IN)

(72) Inventors: Pradip Munshi, Gujarat (IN); Ninad Deepak Ingle, Maharashtra (IN); Santosh Agrawal, Madhya Pradesh (IN); Uttam Maity, West Bengal (IN); Rakshvir Jasra, Gujarat (IN); Sunil Peter, Kerala (IN); Vriti Singh, Maharashtra (IN); Vishal Bhupendrakumar Shah, Surat (IN); Gordhan Das Goyal, Maharashtra (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 438 days.

(21) Appl. No.: 16/480,520

(22) PCT Filed: Jan. 19, 2018

(86) PCT No.: PCT/IB2018/050339
§ 371 (c)(1),
(2) Date: Jul. 24, 2019

(87) PCT Pub. No.: WO2018/138611
PCT Pub. Date: Aug. 2, 2018

(65) Prior Publication Data
US 2019/0389985 A1 Dec. 26, 2019

(30) Foreign Application Priority Data
Jan. 25, 2017 (IN) .............. 201621044205

(51) Int. Cl.
*C08F 114/06* (2006.01)
*C08J 3/28* (2006.01)

(52) U.S. Cl.
CPC ............. *C08F 114/06* (2013.01); *C08J 3/28* (2013.01)

(58) Field of Classification Search
CPC .... C08F 6/003; C08F 6/02; C08F 8/22; C08F 114/06; C08J 3/28; C08K 2003/2206; C08K 2201/104; C08L 27/24; C08L 101/08
See application file for complete search history.

(56) References Cited

U.S. PATENT DOCUMENTS 4,448,658 A * 5/1984 Olson ............... C08F 8/22 522/132
5,359,011 A * 10/1994 Vielhaber .......... C08F 8/00 525/331.6

(Continued)

FOREIGN PATENT DOCUMENTS

| CN | 104395359 A | 3/2015 |
| KR | 20120087480 A | 8/2012 |
| WO | 2016/012937 A1 | 1/2016 |

OTHER PUBLICATIONS

International Search Report of PCT/IB2018/050339, dated Sep. 4, 2018.

*Primary Examiner* — Sanza L. McClendon
(74) *Attorney, Agent, or Firm* — Collard & Roe, P.C.

(57) ABSTRACT

The present disclosure provides an effective and efficient process for the preparation of a dry chlorinated polyvinyl chloride (CPVC), comprising introducing chlorine gas into slurry of polyvinyl chloride in water to obtain a reaction mixture; irradiating the reaction mixture to obtain a product mixture comprising CPVC and water solution including unreacted chlorine gas and hydrogen chloride; filtering the product mixture to obtain a first mass; adding water to the first mass for extracting unreacted chlorine gas and hydrogen chloride to obtain an aqueous suspension, and filtering (Continued)

the aqueous suspension to obtain a second mass; passing nitrogen through the second mass to extract residual water solution to leave behind a third mass; and agitating the third mass in a high-speed mixer together with a neutralizing agent, and optionally with a stabilizer and a processing additive to obtain dry thermally stable CPVC with thermal stability in the range of 1000 seconds to 1500 seconds.

11 Claims, 2 Drawing Sheets

(56) References Cited

U.S. PATENT DOCUMENTS

| | | | |
|---|---|---|---|
| 6,384,149 B2 * | 5/2002 | Tadokoro | C08F 8/22 |
| | | | 525/331.6 |
| 7,345,114 B2 * | 3/2008 | Yoshimi | C08F 8/20 |
| | | | 525/331.5 |
| 10,035,865 B2 * | 7/2018 | Munshi | C08J 3/28 |
| 10,081,687 B2 * | 9/2018 | Munshi | B01J 19/123 |
| 10,370,463 B2 * | 8/2019 | Munshi | C08F 8/22 |
| 2017/0051081 A1 * | 2/2017 | Munshi | B01J 19/123 |

* cited by examiner

PROCESS FOR THE PREPARATION OF DRY CHLORINATED POLYVINYL CHLORIDE

CROSS REFERENCE TO RELATED APPLICATIONS

This application is the National Stage of PCT/IB2018/050339 filed on Jan. 19, 2018, which claims priority under 35 U.S.C. § 119 of Indian Application No. 201621044205 filed on Jan. 25, 2017, the disclosures of which are incorporated by reference. The international application under PCT article 21(2) was published in English.

FIELD

The present disclosure relates to a process for the preparation of chlorinated polyvinyl chloride.

DEFINITIONS

As used in the present disclosure, the following words and phrases are generally intended to have the meaning as set forth below, except to the extent that the context in which they are used to indicate otherwise.

Thermal Stability: Thermal stability is the stability of a molecule at high temperature; i.e. a molecule with more thermal stability has more resistance time to decompose at high temperature.

BACKGROUND

Chlorination is a process which can improve the properties of certain resinous polymers, notably polyvinyl chloride. Chlorinated polyvinyl chloride (CPVC) is more tolerant to wider temperature ranges and demonstrates improved resiliency in terms of conveying both hot and cold materials. Consequently, CPVC has a wide range of industrial applications including pipes used for hot and cold water distribution in residential and industrial use, transportation of corrosive liquids, high tension cable protection pipes and the like.

Conventionally, chlorinated polyvinyl chloride (CPVC) is produced by photo chlorination of polyvinyl chloride (PVC) in an aqueous medium using molecular chlorine gas. During this process, hydrochloric acid is produced as a by-product which along with the unreacted chlorine gas remain present in the pores of the solid CPVC which degrade the properties of CPVC such as lower thermal stability and/or impart yellowness to the solid CPVC and thereby limiting the use of CPVC. Therefore, reduction in the content of hydrogen chloride and chlorine gas is necessary to obtain CPVC with better properties.

The conventional methods for the separation of the impurities from the CPVC uses a large amount of water and therefore generates large amount of effluents which need to be treated before discharging. Further, these methods are time consuming as well as cumbersome. As a result, the conventional methods are uneconomical and also create environmental hazards.

There is, therefore, felt a need to provide an economical and efficient process for the production of chlorinated polyvinyl chloride (CPVC) that obviates the drawbacks of the prior art.

OBJECTS

Some of the objects of the present disclosure, which at least one embodiment herein satisfies, are as follows:

An object of the present disclosure is to provide an economical and efficient process for the preparation of chlorinated polyvinyl chloride.

Another object of the present disclosure is to provide a process for the preparation of chlorinated polyvinyl chloride with substantially reduced amounts of unreacted chlorine gas and hydrogen chloride.

Still another object of the present disclosure is to provide chlorinated polyvinyl chloride with improved properties such as thermal stability, color, and inherent viscosity.

Yet another object of the present disclosure is to obtain an article using dry chlorinated polyvinyl chloride.

Other objects and advantages of the present disclosure will be more apparent from the following description, which is not intended to limit the scope of the present disclosure.

SUMMARY

The present disclosure provides a process for the preparation of dry thermally stable chlorinated polyvinyl chloride. The process comprises the following steps:

Initially, polyvinyl chloride and water are introduced in an air tight vessel to form slurry. Chlorine gas is then introduced into the air tight vessel till a chlorine pressure in the range of 1 kg/cm$^2$ to 5 kg/cm$^2$ is attained, followed by stirring the slurry and chlorine gas to obtain a reaction mixture. The step of introducing the chlorine gas is carried out at a mass flow rate in the range of 0.05 kg/hour to 0.4 kg/hour.

The reaction mixture is irradiated using radiation having wavelength in the range of 390 nm to 730 nm, while heating at a temperature in the range of 50° C. to 90° C. to obtain a product mixture comprising chlorinated polyvinyl chloride and water solution including dissolved unreacted chlorine gas and hydrogen chloride.

The step of irradiation is carried out using a source of irradiation having output in the range of 1 watt/kg to 6 watt/kg of polyvinyl chloride. The reaction mixture is irradiated using LED as a source of irradiation.

The product mixture is filtered to obtain a first mass comprising chlorinated polyvinyl chloride, and a first residuary water solution. The amount of water solution present in the first mass is in the range of 10% to 60% by weight.

Water is added to the first mass under stirring for extracting unreacted chlorine gas and hydrogen chloride to obtain an aqueous suspension. The aqueous suspension is filtered under pressure to obtain a second mass comprising chlorinated polyvinyl chloride, and a second residuary water solution.

Nitrogen is passed through the second mass at a temperature in the range of 50° C. to 85° C. to extract away the second residual water solution to leave behind a third mass having water solution content less than 0.5 wt %.

The third mass is agitated in a high-speed mixer together with a neutralizing agent, and optionally with a stabilizer and a processing additive to obtain dry thermally stable chlorinated polyvinyl chloride. The agitation of the third mass with a neutralizing agent, and optionally with a stabilizer and a processing additive causes the residual chlorine gas and residual hydrogen chloride to be released from the third mass.

The neutralizing agent used is calcium hydroxide, in an amount in the range of 1000 ppm to 6000 ppm. The stabilizer used is synthetic hydrotalcite, in an amount in the range of 1000 ppm to 2000 ppm. The processing additive used is a copolymer with acidic groups, in an amount in the range of 500 ppm to 1000 ppm.

The so obtained dry chlorinated polyvinyl chloride has thermal stability in the range of 1000 seconds to 1500 seconds. The dry chlorinated polyvinyl chloride is characterized with chlorine content in the range of 65 wt % to 70 wt %.

The present disclosure also discloses an article prepared from the dry chlorinated polyvinyl chloride as claimed in claim 1.

BRIEF DESCRIPTION OF THE ACCOMPANYING DRAWING

The process for the preparation of chlorinated polyvinyl chloride of the present disclosure will now be described with the help of the accompanying drawing, in which.

DETAILED DESCRIPTION

Figure 1:
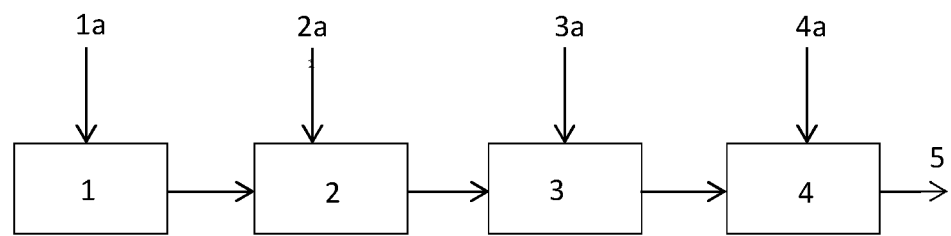
FIG. 1 illustrates the schematic diagram of the process for the chlorination of polyvinyl chloride to obtain a dry chlorinated polyvinyl chloride.

The conventional process for the preparation of the chlorinated polyvinyl chloride (CPVC) comprises chlorination of polyvinyl chloride (PVC) in an aqueous medium using molecular chlorine. The CPVC so produced comprises hydrogen chloride along with unreacted chlorine gas. Further, the conventional process to reduce the contents of hydrogen chloride and unreacted chlorine gas are uneconomical and create environmental hazards.

The present disclosure provides an economical and efficient process for the production of dry thermally stable chlorinated polyvinyl chloride.

In one aspect the present disclosure provides a process for the preparation of dry thermally stable chlorinated polyvinyl chloride.

Initially, the air tight vessel is charged with polyvinyl chloride and water to form slurry. Chlorine gas is then introduced into the air tight vessel till a chlorine pressure in the range of 1 kg/cm$^2$ to 5 kg/cm$^2$ is attained, followed by stirring the slurry and chlorine gas to obtain a reaction mixture.

The so obtained reaction mixture is irradiated using radiation having wavelength in the range of 390 nm to 730 nm, while heating at a temperature in the range of 50° C. to 90° C. to obtain a product mixture comprising chlorinated polyvinyl chloride and water solution including dissolved unreacted chlorine gas and hydrogen chloride.

The product mixture is filtered to obtain a first mass comprising chlorinated polyvinyl chloride, and a first residuary water solution.

In the next step, water is again added to the first mass under stirring for extracting unreacted chlorine gas and hydrogen chloride present in the first mass to obtain an aqueous suspension. The so obtained aqueous suspension is filtered under pressure to obtain a second mass comprising chlorinated polyvinyl chloride, and a second residuary water solution.

Nitrogen is passed through the second mass at a temperature in the range of 50° C. to 85° C. to extract away the second residual water solution to leave behind a third mass having water solution content less than 0.5 wt %.

The third mass is further agitated in a high-speed mixer together with a neutralizing agent, and optionally with a stabilizer and a processing additive to obtain dry thermally stable chlorinated polyvinyl chloride.

In accordance with the embodiments of the present disclosure, the agitation of the third mass with a neutralizing agent, a stabilizer and a processing additive causes the residual chlorine gas and hydrogen chloride to be released from the third mass.

In accordance with the embodiments of the present disclosure, the step of introducing the chlorine gas is carried out at a mass flow rate in the range of 0.05 kg/hour to 0.4 kg/hour. Preferably, the step of introducing the chlorine gas is carried out at mass flow rate is in the range of 0.1 kg/hour to 0.2 kg/hour.

In accordance with the embodiments of the present disclosure, the step of irradiation is carried out using a source of irradiation having output in the range of 1 watt/kg to 6 watt/kg of polyvinyl chloride. Preferably, the step of irradiation is carried out using a source of irradiation having output in the range of 2.5 watt/kg to 4 watt/kg of polyvinyl chloride.

In accordance with an exemplary embodiment of the present disclosure, the reaction mixture is irradiated using LED as a source of irradiation.

In accordance with the embodiments of the present disclosure, the amount of water remained in the first mass is in the range of 10% to 60% by weight.

In accordance with the embodiments of the present disclosure, the neutralizing agent used is calcium hydroxide. The amount of the neutralizing agent is in the range of 1000 ppm to 6000 ppm.

In accordance with the embodiments of the present disclosure, the stabilizer used is synthetic hydrotalcite. The amount of the stabilizer is in the range of 1000 ppm to 2000 ppm.

In accordance with the embodiments of the present disclosure, the processing additive is a copolymer with acidic groups. The amount of the processing additive is in the range of 500 ppm to 1000 ppm.

The dry thermally stable chlorinated polyvinyl chloride obtained by the process of the present disclosure has thermal stability in the range of 1000 seconds to 1500 seconds. The dry chlorinated polyvinyl chloride is further characterized with chlorine content in the range of 65 wt % to 70 wt %.

In another aspect, the present disclosure discloses an article prepared from the dry thermally stable chlorinated polyvinyl chloride obtained by the process of the present disclosure.

In accordance with the process of the present disclosure, the overall preparation is of thermally stable chlorinated polyvinyl chloride is carried out at moderate temperature in the range of 50° C. to 90° C., which helps in obtaining smoothly processable dry thermally stable chlorinated polyvinyl chloride and avoids yellowing and/or degradation of chlorinated polyvinyl chloride. Further, in accordance with the process of the present disclosure, the step of irradiation is carried out using LED as a source, which is environment friendly as well as energy efficient.

In an exemplary embodiment of the present disclosure, the process for the preparation of dry thermally stable chlorinated polyvinyl chloride is performed in the sequence or steps as provided in FIG. 1.

A gas-induced reactor (1) having LEDs as irradiation source(s) and a stirrer is used for the process of chlorination of polyvinyl chloride. Polyvinyl chloride and water are introduced into the air tight vessel (1) through inlet (1a) to form slurry. The gas-induced reactor (1) is made air and/or oxygen free by pressure driven purging of nitrogen. Then, chlorine gas is introduced into the air tight vessel (1) through inlet (1*a*). In the air tight vessel (1), the slurry and chlorine gas are stirred to obtain a reaction mixture. The so obtained reaction mixture is irradiated using LEDs to obtain a product mixture comprising chlorinated polyvinyl chloride and water solution containing dissolved unreacted chlorine gas and hydrogen chloride. When irradiated, chlorine gas photo-dissociates into chlorine radicals which react with polyvinyl chloride and produce chlorinated polyvinyl chloride. The product mixture is then transferred to another vessel (2) for filtration to obtain a first mass comprising chlorinated polyvinyl chloride and residuary water solution. The water is added to the first mass for extracting unreacted chlorine gas and hydrogen chloride to obtain an aqueous suspension. (2*a*) represents the inlet for introducing water in to the vessel (2). The so obtained aqueous suspension is filtered under pressure to obtain a second mass comprising chlorinated polyvinyl chloride and residuary water solution. The second mass is then transferred into a drying chamber (3) for drying, wherein, hot nitrogen at a temperature of 80° C. is introduced through the inlet (3*a*) to extract away residual water solution present in the second mass to leave behind a third mass having water solution content less than 0.5 wt %. The third mass is transferred to high-speed mixer (4) where a neutralizing agent, a stabilizer and a processing additive are introduced sequentially through the inlet (4*a*) and the contents are mixed. The neutralizing agent reduces the acidity of the third mass and dry thermally stable chlorinated polyvinyl chloride is obtained which is taken out from the outlet (5).

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTS

Experiment 1: Preparation of Dry Thermally Stable Chlorinated Polyvinyl Chloride In an air tight reactor, having self-induction agitator and irradiation sources, 130 kg of polyvinyl chloride (PVC) and 720 litres of water was charged to form slurry. The irradiation sources were equipped with LED lights having a wavelength of 450 nm. Chlorine gas was introduced into the reactor to attain a reaction pressure of 1.9 kg/cm$^2$ (absolute) and a temperature of 70° C. The contents of the reactor were stirred to obtain a reaction mixture. The so obtained reaction mixture was irradiated using the LEDs to obtain a product mixture comprising chlorinated polyvinyl chloride and water solution including unreacted chlorine gas and hydrogen chloride. The chlorine consumption was closely monitored and at a chlorine consumption of 77 kg chlorine supply to the reactor was stopped and a product mixture comprising chlorinated polyvinyl chloride having 67% chlorine by weight was obtained. The product mixture was filtered to obtain a first mass comprising chlorinated polyvinyl chloride and residuary water solution. Water was added to the first mass under stirring for extracting unreacted chlorine gas and hydrogen chloride to obtain an aqueous suspension, which was filtered under a pressure gradient of 5 kg/cm$^2$ to obtain a second mass comprising chlorinated polyvinyl chloride and residuary water solution. The second mass was then dried at a temperature of 80° C. using hot nitrogen at a flow rate of 100 kg/hr and a back pressure of 1.2 kg/cm$^2$ to extract away residual water solution to leave behind a third mass having water solution content of 0.1 wt %.

The third mass was agitated in a high-speed mixer at a speed of 3000 rpm with 1500 ppm of calcium hydroxide (Ca(OH)$_2$) and 1500 ppm of synthetic hydrotalcite (SHT). Then, 750 ppm of BYK-P 4100, a processing additive, particularly a releasing agent, was also added and the contents were stirred for a period of 10 minutes and dry thermally stable chlorinated polyvinyl chloride was obtained having an inherent viscosity of 0.834.

Figure 2:
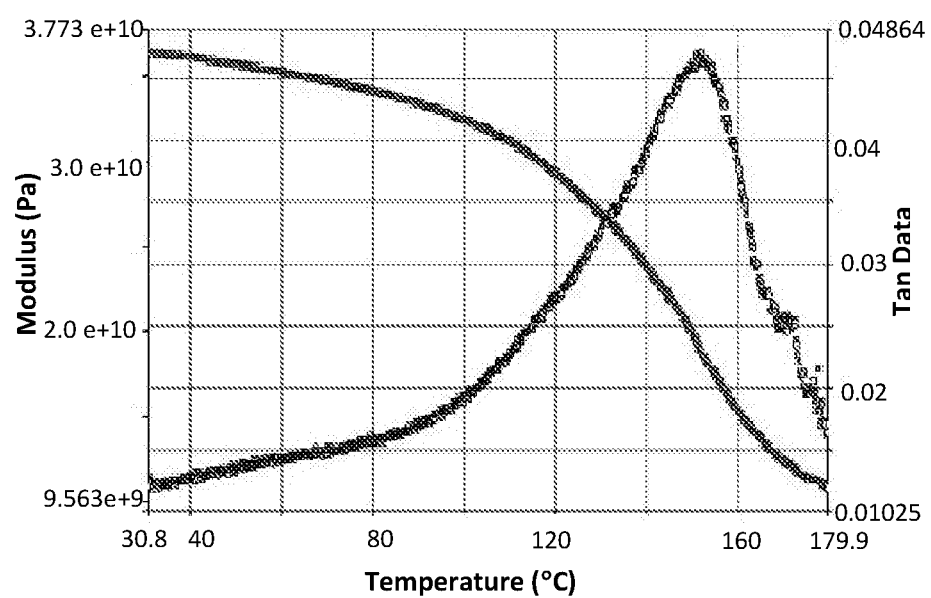
FIG. 2 illustrates a graph depicting dynamic mechanical analysis data (DMA) of the dry chlorinated polyvinyl chloride obtained using the process shown in FIG. 1.

The dry thermally stable chlorinated polyvinyl chloride so obtained was tested with dynamic mechanical analyzer (DMA conditions: 1.0 min hold at 30° C., heat from 30° C. to 180° C. at 2.0° C./min). The results are shown in a FIG. 2. As shown in FIG. 2, dry thermally stable chlorinated polyvinyl chloride when tested showed a smooth transition of temperature vs. time curve which depicts uniform chlorination of poly vinyl chloride with high glass transition temperature (Tg).

Experiments 2 to 6: Thermal Stability of Dry Chlorinated Polyvinyl Chloride

The dry thermally stable chlorinated polyvinyl chloride obtained in Experiment 1 was tested for its thermal stability. Further, the third mass obtained from the Experiment 1 was treated with various amounts of neutralizing agent, stabilizer and processing additive to compare the thermal stability of the dry chlorinated polyvinyl chloride with varying amounts of the neutralizing agent, stabilizer and processing additive. The thermal stability data of the dry thermally stable chlorinated polyvinyl chloride is tabulated herein Table 1 below.

TABLE 1

Thermal stability of dry chlorinated polyvinyl chloride with varying amounts of Neutralizing agent, Stabilizer and processing additive

| Experiment No. | Neutralizing Agent (ppm) Ca(OH)$_2$ | Stabilizer (ppm) SHT | Additive (ppm) BYK-P 4100 | Thermal Stability (seconds) |
|---|---|---|---|---|
| 1 | 1500 | 1500 | 750 | 1019 |
| 2 | 3000 | 1500 | 750 | 1236 |
| 3 | 6000 | 1500 | 750 | 1476 |
| 4 | 0 | 1500 | 0 | 660 |
| 5 | 3000 | 0 | 0 | 708 |
| 6 | 0 | 0 | 750 | 732 |

It is evident from Table 1 that the thermal stability of dry chlorinated polyvinyl chloride obtained by the process of the present disclosure is higher, wherein chlorinated polyvinyl chloride is treated with the neutralizing agent, the stabilizer and the processing additive.

Further, it is evident from Table 1 that absence of any of the component selected from the neutralizing agent, the stabilizer and the processing additive will result in decrease in the thermal stability of dry chlorinated polyvinyl chloride.

Still further, it is evident from Table 1 that the thermal stability of dry chlorinated polyvinyl chloride increases with the increasing amounts of the neutralizing agent.

TECHNICAL ADVANCEMENTS

The present disclosure described herein above has several technical advantages including, but not limited to, the realization of:

an economic and efficient process for the preparation of dry thermally stable chlorinated polyvinyl chloride;

chlorinated polyvinyl chloride with improved thermal stability, and inherent viscosity; and an article prepared from the dry chlorinated polyvinyl chloride.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the preparation of dry thermally stable chlorinated polyvinyl chloride, said process comprising:
   i. introducing polyvinyl chloride and water in an air tight vessel to form a slurry;
   ii. introducing chlorine gas into said air tight vessel till a chlorine pressure in the range of 1 kg/cm$^2$ to 5 kg/cm$^2$ is attained, and stirring the slurry and chlorine gas to obtain a reaction mixture;
   iii. irradiating said reaction mixture using radiation having a wavelength in the range of 390 nm to 730 nm, while heating at a temperature in the range of 50° C. to 90° C. to obtain a product mixture comprising chlorinated polyvinyl chloride and water solution including dissolved unreacted chlorine gas and hydrogen chloride;
   iv. filtering said product mixture to obtain a first mass comprising chlorinated polyvinyl chloride, and a first residuary water solution;
   v. adding water to said first mass under stirring for extracting unreacted chlorine gas and hydrogen chloride to obtain an aqueous suspension, followed by pressure filtering said aqueous suspension to obtain a second mass comprising chlorinated polyvinyl chloride, and a second residuary water solution;
   vi. passing nitrogen through said second mass at a temperature in the range of 50° C. to 85° C. to extract away said second residual water solution to leave behind a third mass having water solution content less than 0.5 wt %; and
   vii. agitating said third mass in a high-speed mixer together with a neutralizing agent, and optionally with a stabilizer and a processing additive to obtain dry thermally stable chlorinated polyvinyl chloride having thermal stability in the range of 1000 seconds to 1500 seconds.

2. The process as claimed in claim 1, wherein said process step (vii) of agitating said third mass with a neutralizing agent, and optionally with a stabilizer and a processing additive causes the residual chlorine gas and residual hydrogen chloride to be released from said third mass.

3. The process as claimed in claim 1, wherein said process further comprises the step of removing air from the air tight vessel before the step of introducing the chlorine gas.

4. The process as claimed in claim 1, wherein the step of introducing the chlorine gas is carried out at a mass flow rate in the range of 0.05 kg/hour to 0.4 kg/hour.

5. The process as claimed in claim 1, wherein said step of irradiation is carried out using a source of irradiation having output in the range of 1 watt/kg to 6 watt/kg of polyvinyl chloride.

6. The process as claimed in claim 1, wherein said reaction mixture is irradiated using LED as a source of irradiation.

7. The process as claimed in claim 1, wherein the amount of water present in said first mass is in the range of 10% to 60% by weight.

8. The process as claimed in claim 1, wherein:
said neutralizing agent is calcium hydroxide,
said stabilizer is synthetic hydrotalcite; and
said processing additive is a copolymer with acidic groups.

9. The process as claimed in claim 1, wherein:
the amount of said neutralizing agent is in the range of 1000 ppm to 6000 ppm,
the amount of said stabilizer is in the range of 1000 ppm to 2000 ppm; and
the amount of said processing additive is in the range of 500 ppm to 1000 ppm.

10. The process as claimed in claim 1, wherein said dry chlorinated polyvinyl chloride is characterized with chlorine content in the range of 65 wt % to 70 wt %.

11. An article prepared from said dry chlorinated polyvinyl chloride as claimed in claim 1.

* * * * *